United States Patent
Loddo et al.

(10) Patent No.: US 10,762,560 B1
(45) Date of Patent: Sep. 1, 2020

(54) SYSTEMS AND COMPUTER-IMPLEMENTED PROCESSES FOR MODEL-BASED UNDERWRITING

(71) Applicant: Capital One Services, LLC, McLean, VA (US)

(72) Inventors: Antonello Loddo, Gettysburg, PA (US); Lu Su, Great Falls, VA (US); Leonard Roseman, Richmond, VA (US); Ram Narayan, Arlington, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 15/903,161

(22) Filed: Feb. 23, 2018

Related U.S. Application Data

(63) Continuation of application No. 14/202,356, filed on Mar. 10, 2014.

(60) Provisional application No. 61/789,021, filed on Mar. 15, 2013.

(51) Int. Cl.
*G06Q 40/00* (2012.01)
*G06Q 40/02* (2012.01)

(52) U.S. Cl.
CPC .................. *G06Q 40/025* (2013.01)

(58) Field of Classification Search
CPC .................................................. G06Q 40/02
USPC .................................................... 705/35–45
See application file for complete search history.

(56) References Cited

U.S. PATENT DOCUMENTS

| | | | | |
|---|---|---|---|---|
| 6,324,524 B1* | 11/2001 | Lent | ....................... | G06Q 20/10 705/14.39 |
| 7,472,090 B1* | 12/2008 | White | ..................... | G06Q 20/10 705/35 |
| 7,509,285 B1* | 3/2009 | Maniar | .............. | G06Q 20/3674 705/35 |
| 7,689,504 B2* | 3/2010 | Warren | .................. | G06Q 20/10 705/38 |
| 7,844,518 B1* | 11/2010 | Cox | ...................... | G06Q 20/102 705/35 |
| 8,498,915 B2* | 7/2013 | Eder | ....................... | G06Q 40/06 705/35 |
| 8,930,262 B1* | 1/2015 | Searson | ................. | G06Q 40/02 705/38 |
| 2002/0007341 A1* | 1/2002 | Lent | ....................... | G06Q 30/06 705/38 |
| 2002/0184140 A1* | 12/2002 | Quaile | ................. | G06Q 40/025 705/38 |
| 2003/0004868 A1* | 1/2003 | Early | ..................... | G06Q 20/10 705/39 |

(Continued)

OTHER PUBLICATIONS

Using a credit card for overdraft proteciton bank rate (Year: 2006).*

*Primary Examiner* — Bruce I Ebersman
(74) *Attorney, Agent, or Firm* — Finnegan, Henderson, Farabow, Garrett & Dunner, LLP

(57) ABSTRACT

Systems and methods are disclosed for determining one or more credit lines based on statistical approximations of credit line optimization models. By approximating the results of the optimization model, the disclosed embodiments may provide real-time account level credit line determinations based on fewer criteria than used in the optimization models. Other aspects of the disclosed embodiments are described herein.

18 Claims, 3 Drawing Sheets

(56) References Cited

U.S. PATENT DOCUMENTS

| | | | | |
|---|---|---|---|---|
| 2003/0195840 A1* | 10/2003 | Xu | ............... | G06Q 20/4016 |
| | | | | 705/38 |
| 2004/0024667 A1* | 2/2004 | Quaile | ............... | G06Q 20/10 |
| | | | | 705/35 |
| 2004/0111363 A1* | 6/2004 | Trench | ............... | G06Q 20/10 |
| | | | | 705/39 |
| 2005/0130704 A1* | 6/2005 | McParland | ............... | G06Q 40/02 |
| | | | | 455/556.2 |
| 2005/0279824 A1* | 12/2005 | Anderson | ............... | G06Q 30/02 |
| | | | | 235/380 |
| 2006/0080251 A1* | 4/2006 | Fried | ............... | G06Q 20/108 |
| | | | | 705/42 |
| 2006/0161487 A1* | 7/2006 | Saxena | ............... | G06Q 40/00 |
| | | | | 705/35 |
| 2006/0178984 A1* | 8/2006 | Anderson | ............... | G06Q 20/04 |
| | | | | 705/39 |
| 2006/0242048 A1* | 10/2006 | Haggerty | ............... | G06Q 40/00 |
| | | | | 705/35 |
| 2007/0050288 A1* | 3/2007 | Sarkar | ............... | G06Q 30/0254 |
| | | | | 705/38 |
| 2008/0221972 A1* | 9/2008 | Megdal | ............... | G06Q 40/02 |
| | | | | 705/7.29 |
| 2009/0144103 A1* | 6/2009 | Malov | ............... | G06Q 40/06 |
| | | | | 705/7.35 |
| 2009/0299886 A1* | 12/2009 | Newman | ............... | G06Q 20/24 |
| | | | | 705/35 |
| 2009/0313163 A1* | 12/2009 | Wang | ............... | G06Q 40/00 |
| | | | | 705/38 |
| 2012/0254092 A1* | 10/2012 | Malov | ............... | G06Q 30/0201 |
| | | | | 706/52 |
| 2012/0265681 A1* | 10/2012 | Ross | ............... | G06Q 40/02 |
| | | | | 705/44 |
| 2013/0030983 A1* | 1/2013 | Fahner | ............... | G06Q 40/02 |
| | | | | 705/38 |
| 2013/0226777 A1* | 8/2013 | Hu | ............... | G06Q 40/02 |
| | | | | 705/38 |
| 2014/0156501 A1* | 6/2014 | Howe | ............... | G06Q 40/025 |
| | | | | 705/38 |

* cited by examiner

SYSTEMS AND COMPUTER-IMPLEMENTED PROCESSES FOR MODEL-BASED UNDERWRITING

CROSS-REFERENCE TO RELATED APPLICATION

This application is a continuation of U.S. patent application Ser. No. 14/202,356, filed Mar. 10, 2014, which claims priority to U.S. Provisional Application No. 61/789,021, filed on Mar. 15, 2013, the entire contents of which are hereby incorporated by reference.

FIELD

The disclosed embodiments generally relate to underwriting processes for financial service accounts, and more particularly, to processes and systems for using model approximations to determine credit line increases, approve new accounts for lines of credit, and other aspects of financial service accounts.

Currently, account-level underwriting is accomplished by grouping customers into segments based on account-holder features (e.g., FICO scores, card utilization, etc.), assigning all accounts within that segment to the same underwriting criteria (accept/decline, credit line, etc.), and computing the lifetime value of the segment through aggregating lifetime values computed by a sophisticated account-level statistical lifetime value model (LVM) conditional on the underwriting criteria for the segment. Conceptually, underwriting criteria for a segment should be determined by maximizing segment-level lifetime value subject to account-level and portfolio-level constraints, but the actual process is one of trial and error: segments are defined and underwriting criteria are assigned based on educated predictions, and those predictions are modified based on performance evaluations. The optimization problem may be too complicated and may require too much run time to provide optimal underwriting values using the LVM for each individual client. Since all clients within a segment are assigned the same underwriting value, some clients may get far from optimal underwriting values. When individual clients request an account or an increased credit line, the underwriting decision is often just a best guess made by analysts using the underwriting criteria and lifetime value for the entire segment rather than the best values for that individual.

It is therefore desirable to provide a system and process that provides close-to-optimal underwriting criteria at the account level that is practical to use in a real-time environment.

SUMMARY

Disclosed embodiments include systems and processes for enabling a financial service account provider to determine an optimal line of credit, a new account line of credit, or similar financial decision for individual clients based on a statistical approximation of an optimization model.

In certain embodiments, a computer-implemented method for determining a credit line of a customer of a financial service provider is provided. The method includes receiving historical account data relating to a set of financial service accounts and, using a processor, analyzing the historical data using an optimization model. The method also includes determining, by the processor, optimal credit limits for the set of accounts based on the optimization model and generating a statistical approximation of the optimal credit limits based on one or more account data criteria associated with the financial service accounts. The method further includes receiving a request for a credit line determination for the customer that includes one or more values for the account data criteria that was used to generate the statistical approximation. The method also includes determining, by the processor, the credit line for the customer based on the one or more account data values and the statistical approximation.

In certain embodiments, a financial service account provider system for determining a credit line for a customer of a financial service account provider is provided. The financial service account provider system may include a memory storing instructions and a processor configured to execute the instructions in the memory. The processor may be configured to receive historical account data relating to a set of financial service accounts and analyze the historical account data using an optimization model. The processor may also be configured to determine optimal credit limits for the set of accounts based on the optimization model and generate a statistical approximation of the optimal credit limits based on one or more account data criteria associated with the financial service accounts. The processor may be further configured to receive a request for a credit line determination for the customer that includes one or more values for the account data criteria that was used to generate the statistical approximation. The processor may then determine the credit line for the customer based on the one or more account data values and the statistical approximation.

In certain embodiments, systems and processes are provided for enabling a business to produce close-to-optimal account-level or customer-level decisions based on a statistical approximation of an optimization model for use in such activities as distributing marketing messages, offering promotions or discounts to customers, implicitly or explicitly pricing products, or in other similar decision-making activities for individual clients.

In certain embodiments, a financial service account system for determining optimal credit limits is provided comprising a memory storing instructions and a processor configured to execute the instructions to perform operations. The operations may comprise receiving account data relating to a set of financial service accounts, analyzing, by the processor, the account data using an optimization model, determining, by the processor, optimal credit limits for the set of financial service accounts based on the optimization model, and generating, by the processor, a statistical approximation of the optimal credit limits based on one or more account data criteria associated with the financial service accounts.

In certain embodiments, a financial services account system is provided comprising a memory storing instructions and a processor configured to execute the instructions to implement modules. In some embodiments, the modules may include a data miner module configured to obtain account data, an optimization model module configured to determine optimal credit lines for a plurality of customers based on the account data, and a statistical approximation module configured to generate a statistical approximation of the optimal credit lines.

Consistent with other disclosed embodiments, tangible computer-readable storage media may store program instructions executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
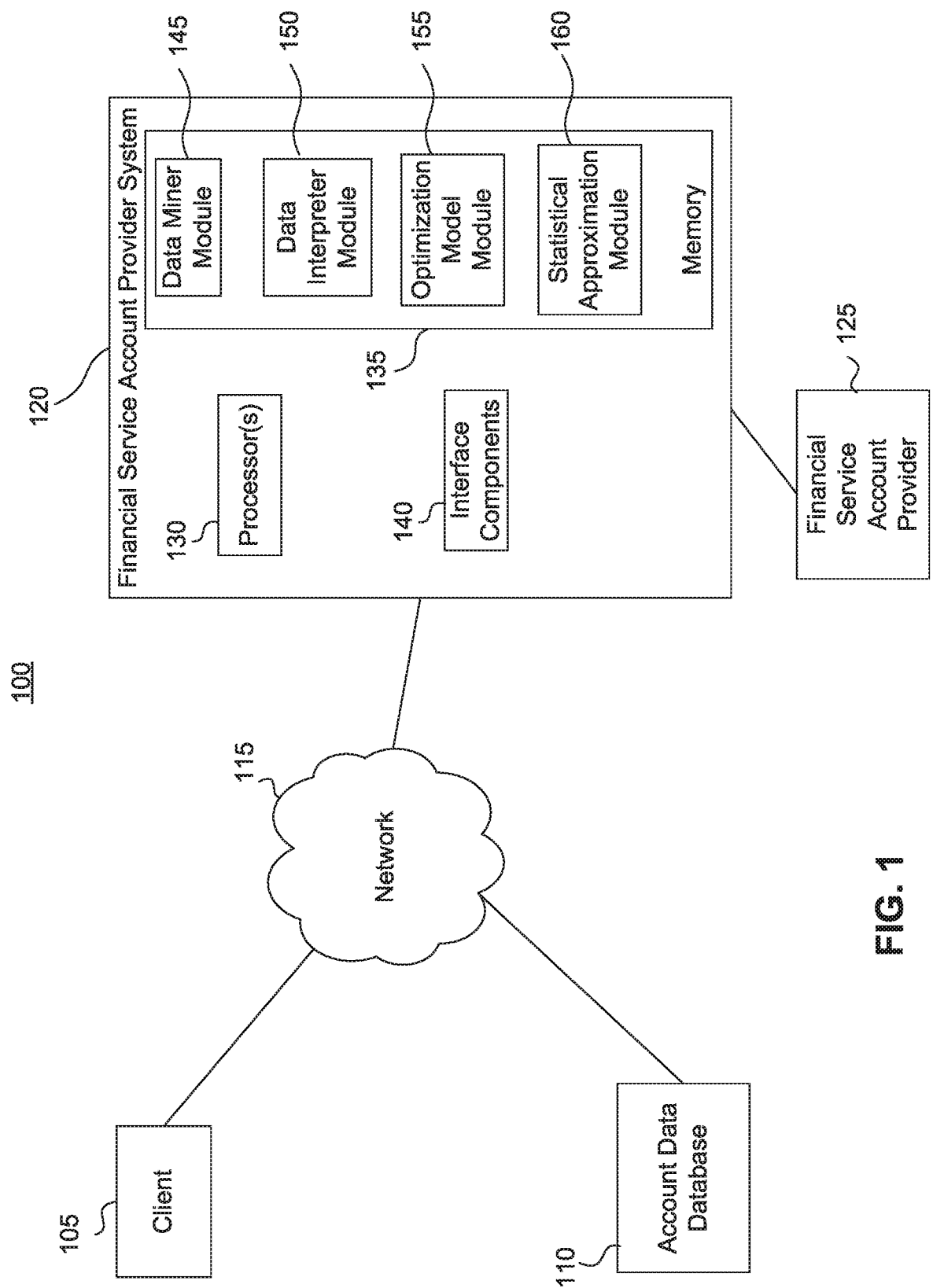
FIG. 1 is an exemplary system that may be used to implement the disclosed embodiments.

FIG. 1 is an exemplary system configured to perform one or more software processes that, when executed by one or more processors, provide one or more aspects of the disclosed embodiments. The components and arrangement shown in FIG. 1 are not intended to be limiting to any disclosed embodiments, as the components used to implement the processes and features disclosed here may vary.

In accordance with certain disclosed embodiments, a system 100 may be provided that includes one or more clients 105, a network 115, a financial service account provider system 120 associated with a financial service account provider 125, and one or more account databases 120. In one aspect, client 105 may be associated with a customer of financial service account provider 125. Other components known to one of ordinary skill in the art may be included in system 100 to process, transmit, provide, and receive information consistent with the disclosed embodiments.

Financial service account provider system 120 may be a computer-based system including computer system components, such as one or more servers, desktop computers, workstations, tablets, hand held computing devices, memory devices, and/or internal network(s) connecting the components. In one embodiment, financial service account provider system 120 may be a server that includes one or more processors 130, memory devices, such as memory 135, and interface components 140. Financial service account provider system 120 may be a single server or may be configured as a distributed computer system including multiple servers or computers that interoperate to perform one or more of the processes and functionalities associated with the disclosed embodiments. In certain embodiments, financial service account provider system 120 may be a server associated with a financial service account provider 125, such as, for example, a bank, lender, merchant, credit card provider, or any other entity that provides financial service accounts to customers. Financial service accounts may include, for example, credit card accounts, checking accounts, savings accounts, loans, investment accounts, and any other type of account relating to financial products. In one aspect, financial service account provider 125 may be a provider that advertises, solicits, or otherwise communicates with customers to offer financial service accounts or negotiate changes to existing financial service accounts to customers provided by financial service account provider 125.

Processor(s) 130 may be one or more known processing devices, such as a microprocessor from the Pentium™ family manufactured by Intel™ or the Turion™ family manufactured by AMD™. Processor(s) 130 may include a single core or multiple core processor system that provides the ability to perform parallel processes simultaneously. For example, processor 130 may be a single core processor that is configured with virtual processing technologies known to those skilled in the art. In certain embodiments, processor 130 may use logical processors to simultaneously execute and control multiple processes. Processor 130 may implement virtual machine technologies, or other similar known technologies to provide the ability to execute, control, run, manipulate, store, etc. multiple software processes, applications, programs, etc. In another embodiment, processor(s) 130 may include a multiple-core processor arrangement (e.g., dual or quad core) that is configured to provide parallel processing functionalities to allow financial service account provider system 120 to execute multiple processes simultaneously. One of ordinary skill in the art would understand that other types of processor arrangements could be implemented that provide for the capabilities disclosed herein.

Financial service account provider system 120 may include one or more storage devices configured to store information used by processor 130 (or other components) to perform certain functions related to the disclosed embodiments. In one example, financial service account provider system 120 may include a memory 135 that includes instructions to enable processor(s) 130 to execute one or more applications, such as server applications, network communication processes, and any other type of application or software known to be available on computer systems. Alternatively, the instructions, application programs, etc. may be stored in an external storage or available from memory over a network. The one or more storage devices may be a volatile or non-volatile, magnetic, semiconductor, tape, optical, removable, nonremovable, or other type of storage device or tangible computer-readable medium.

In one embodiment, financial service account provider system 120 includes a memory 135 that includes instructions that, when executed by processor(s) 130, perform one or more processes consistent with the functionalities disclosed herein. Methods, systems, and articles of manufacture consistent with disclosed embodiments are not limited to separate programs or computers configured to perform dedicated tasks. For example, financial service account provider system 120 may include a memory that may include one or more programs to perform one or more functions of interface components 109. Moreover, processor(s) 130 may execute one or more programs located remotely from system 100. For example, system 100 may access one or more remote programs, that, when executed, perform functions related to disclosed embodiments. Memory 135 may include one or more memory devices that store data and instructions used to perform one or more features of the disclosed embodiments. Memory 135 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In certain embodiments, memory 135 may include software components that, when executed by processor(s) 130, perform one or more processes consistent with the disclosed embodiments. For example, memory 135 may include a data miner module 145, data interpreter module 150, optimization model module 155, and statistical approximation module 160, each of which may include software instructions executable by one or more processors, such as processor(s) 130, alone or in various combinations. When executed, the software instructions for the data miner module 145, data interpreter module 150, optimization model module 155, and/or statistical approximation module 160, may provide features relating determining an optimal credit limit or other account decision based on a statistical approximation of an optimization model consistent with the disclosed embodiments. The arrangement of the software modules 145-160 is not limited to that shown in FIG. 1 and described herein. For example, modules 145, 150, 155, and/or 160 may be combined into one or more software modules to perform one or more features consistent with the disclosed embodiments. Modules 145-160 may also be stored in one or more memory devices remote from financial service account provider 120 and retrieved or executed remotely, with results of the execution being provided to financial service account provider 120 for subsequent processing.

In certain embodiments, data miner module 145 may be configured to perform functions that find, copy, transmit, and store information on occupations and indicators of stability from external sources, such as account data database 110, to financial service account provider system 120. Data interpreter module 150 may be configured to clean and format account data from various sources (such as account data database 110) to remove errors in the data, consolidate data, and/or create more uniform data. Optimization model module 155 may be configured to determine the optimal line of credit for a plurality of customers (or a segment of customers) based on a plurality of criteria about each customer (or the segment of customers) and/or the customer's account data (or the account data associated with the segment of customers) such as FICO score, card utilization, income, etc.

Statistical approximation module 160 may be configured to generate a statistical approximation of the results obtained from the optimization model module. Statistical approximation module 160 may be configured to select from a plurality of approximations the statistical approximation that provides the best fit for the results of the optimization model based on the variety of account data criteria available. For example, the statistical approximation module 160 may be configured to analyze and compare the fit of the data to a linear regression based on FICO scores, a linear regression based on income, a logistical regression based on FICO scores, and a logistical regression based on income to determine the statistical approximation that best fits the data. The statistical approximation module 160 may be further configured to attempt certain statistical approximations for only certain types of account data criteria. For example, the statistical approximation module may be configured to analyze linear regression analysis only with linear or near-linear account data criteria and it may be configured to analyze logistical analysis only with categorical account data criteria. Alternatively, statistical approximation module 160 may be configured to select a statistical approximation based on considerations in addition to, or in lieu of, best fit. For example, statistical approximation module 160 may be configured to select a statistical approximation module that provides the best fit for any one of the account data criteria for which at least 80% of customers have data for that criterion. Statistical approximation module 160 may also be configured to determine an optimal credit line for a particular customer based on one or more criteria of the customer and/or the customer's account and the statistical approximation.

Financial service account provider system 120 may also be communicatively connected to one or more memory devices (e.g., account data database 110 or other databases (not shown)) locally or through a network. In certain embodiments, account data database 110 is contained within financial service account provider system 120. In certain embodiments, account data database 110 stores information about customers (i.e., current customers or potential customers), including data associated with customers and their accounts that may be accessed by financial service account provider system 120. This account data may include such criteria as past customer behavior (card utilization, account history, etc.), credit data (FICO scores, number of financial service accounts associated with customer, etc.), specific customer demographic and financial data (income, occupation, age, education, homeownership information, etc.) and non-financial data (other products used, geography, etc.). This data may be obtained from many sources, for example, from the customer, publicly available sources, government agencies, private companies (such as credit bureaus), and/or the financial service account provider 125. Account data database 105 may be associated with financial service account provider 125. For example, financial service account provider 125 may be interested in analyzing the line of credit decisions for its current customers using a statistical approximation of the optimization model and account data that it has collected in account data database 105 about its current customers. Remote memory devices may be configured to store information and may be accessed and/or managed by financial service account provider system 125. By way of example, the remote memory devices may employ a document management system. Systems and methods of disclosed embodiments, however, are not limited to separate databases or even to the use of a database.

Financial service account provider system 120 may also include one or more I/O devices that may comprise one or more interfaces for receiving signals, or input from input devices, and providing signals or output to one or more output devices that allow data to be received and/or transmitted by financial service account provider system 120. For example, financial service account provider system 120 may include interface components 140 that may provide interfaces to one or more input devices. Input devices may include, for example, one or more keyboards, mouse devices, and the like, that enable financial service account provider system 120 to receive data from one or more users, such as customers using clients 105 or representatives of financial service account provider 125. Further, interface components 140 may include components configured to send and receive information between components of financial service account provider system 120, account data database 110, and/or clients 105. Interface components 140 may interface with other components or devices through network 115.

Network 115 may be any type of network that provides communications, exchanges information, and/or facilitates the exchange of information between financial service account provider system 120, client 105, and account database 110. In one embodiment, network 115 may be the Internet, a Local Area Network, or other suitable connection(s) that enables system 100 to send and receive information between the components of system 100.

Client 105 may each be one or more computer systems associated with or used by one or more customers. For example, client 105 may include a general purpose or notebook computer, a mobile device with computing ability, a server, a desktop computer, tablet, or any combination of these computers and/or affiliated components. In one embodiment, each client may be a computer system or device that is operated by a customer who may be a current customer or a potential customer of financial service provider 125. In one embodiment, client 105 may be a computer system or device that is operated by a representative of financial provider 125 or a third party, such as, for example, a proxy for a customer or potential customer. In such an embodiment, the representative or third party may use client 105 to aid the customer or potential customer in requesting a new account, requesting an increase in credit line, providing account information, or other process associated with the disclosed embodiments. Client 105 may be configured with storage that stores one or more operating systems that perform known operating system functions when executed by one or more processors. By way of example, the operating systems may include Microsoft Windows™, Unix™, Linux™, or Apple™ type operating systems. The operating systems may also include Personal Digital Assistant (PDA) type operating systems, such as Microsoft CE™, Apple iOS, or other types of operating systems. Embodiments of the disclosed invention will operate and function with computer systems running any type of operating system. Client 105 may also include communication software that, when executed by a processor, provides communications with network 115, such as Web browser software, tablet or smart hand held device networking software, etc. Accordingly, client 105 may be a device that executes mobile applications, such as a tablet or mobile device.

Figure 2:
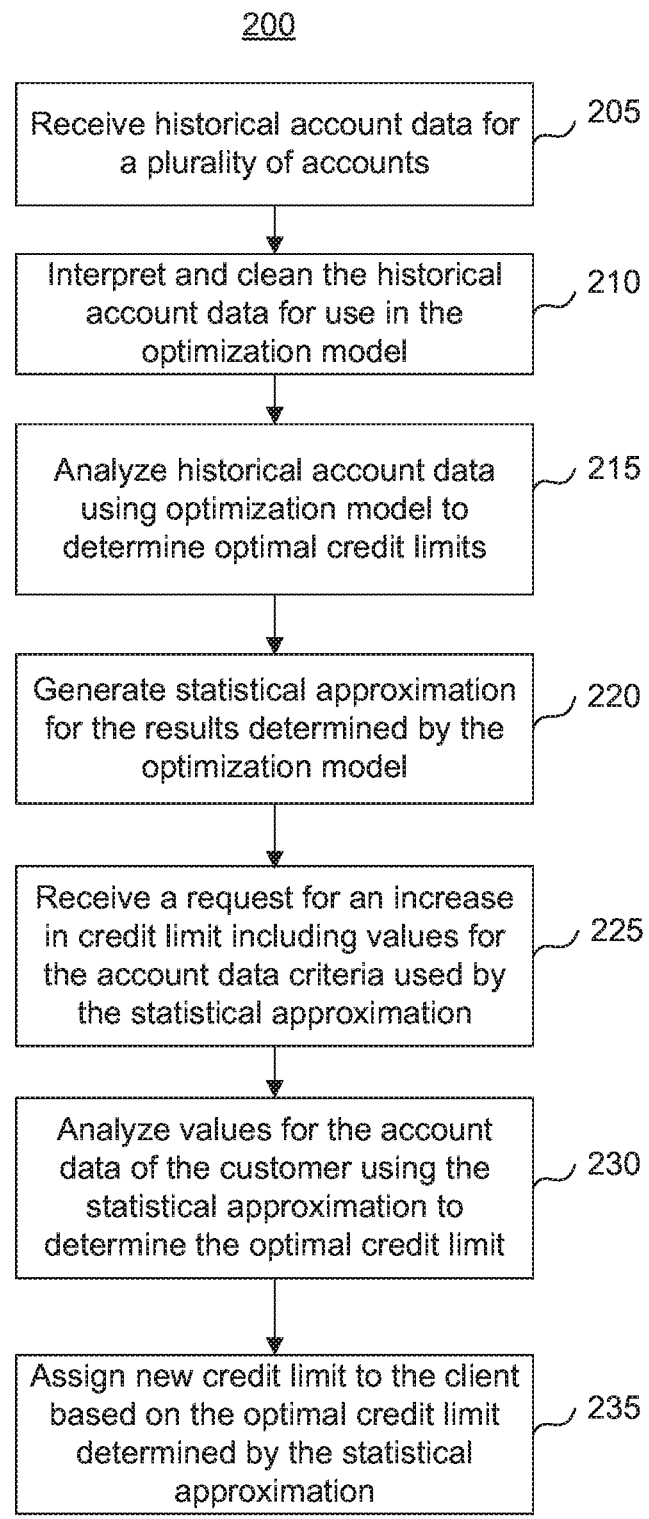
FIG. 2 is a flowchart of an exemplary process for determining a credit line increase using model approximations consistent with the disclosed embodiments.

FIG. 2 depicts a flowchart of an exemplary process for determining a credit line increase using model approximations consistent with the disclosed embodiments. As shown in process 200, financial service account provider system 120 may receive historical account data for one or more customers of financial service account provider 125 (step 205). In one aspect, financial service account provider system 120 may receive the data as a result of data mining conducted, for example, by data miner module 145. The historical account data may be stored in a memory 135 operated by a financial service account provider 125. Account data may include, for example, past customer behavior (card utilization, account history, etc.), credit data (FICO scores, number of financial service accounts associated with customer, etc.), specific customer demographic and financial data (income, occupation, age, education, homeownership information, etc.) and non-financial data (other products used, geography, etc.). Additional account data that may be used in the optimization model may also be considered. The account data may be provided by the entity that operates process 200 (e.g., financial service account provider 125). Alternatively, account data may be obtained, via a network 103, from various public and private account data databases 110 (see also, data miner 111 and related text below). For example, FICO maintains databases of FICO scores for customers suitable for use in process 200.

In step 210, financial service account provider system 120 may interpret the account data (e.g., cleaned and properly formatted, for example, by data interpreter 150 of FIG. 1) so that the data is suitable for use in process 200. For example, data interpreter 150 may clean, format, and consolidate data received from various sources (or from a single source) so that the data is easier to manipulate. Account data may be obtained from free-form (unstructured) text that may have typographical errors, abbreviations, synonyms, near homonyms, symbols (or lack of symbols), or other errors that make consolidating the data difficult. This data may be received from data miner module 145, which may have obtained account data database 110. Words may be expanded to remove abbreviations based on lists of abbreviations, expansions, and substitutions in order to substitute the complete word for the abbreviated word. In certain embodiments, a list of stop words (i.e., words that do not add special meaning such as "and," "the," etc.) and/or a list of special characters and punctuation (e.g., #, $, %) may be used to remove stop words and special characters from the data (e.g., to change "$1,000.00" to "1000"). Alternatively, a list of special characters and punctuation may be used to add special characters from the data (e.g., to convert "1000" to "$1,000.00"). One or more dictionaries may also be used to check the spelling of words in the data, replacing the misspellings with correctly spelled words. Natural language processing or other processing may also be used to group data within certain criteria (e.g., to convert "widowed," "divorced," or "single" into "single").

In certain aspects, financial service account provider system 120 may store an optimization model (e.g., in optimization model module 155) that is configured to, when executed by a processor, determine the optimal credit level for an individual customer using a plurality of account data criteria. At step 215, the optimization model may analyze the historical account data for a plurality of customers based on a plurality of account criteria to determine the optimal credit limit for each account. In general, the more account data criteria used by the optimization model, the more accurate the determination of the credit limit for that account will be. One of ordinary skill in the art would understand an appropriate number of and type of account data criteria needed for an optimization model with the desired level of accuracy. In certain aspects, financial service account provider system 120 may consider a large number of accounts to provide a more robust data set from which to generate a statistical approximation. One of ordinary skill in the art would understand the number of accounts needed to provide sufficient optimal credit limit data points to generate a statistical approximation with the desired level of accuracy.

In certain aspects, the optimization model may be configured to receive account data about a customer and to model the likely outcomes associated with a number of credit limits to determine an optimal credit limit for the customer. Aspects of the disclosed embodiments may implement known optimization models, and one of skill in the art would understand and be able to implement appropriate optimization models consistent with the disclosed embodiments. Financial service account provider system 120 may store the optimal credit limits determined for each customer (e.g., in the optimization model module 155 of memory 135).

In step 220, financial service account provider system 120 may generate a statistical approximation of the optimal credit limits for the customers associated with the historical account data (e.g., by statistical approximation module 160) based on the optimal credit limits determined by the optimization model. The statistical approximation may rely on fewer than all of the account data criteria used by the optimization model. The statistical approximation may be a regression analysis, which includes parametric regressions, such as linear regressions and nonparametric regressions including, for example, Kernel regression. In one aspect, financial service account provider system 120 may analyze one or more approximations based on one or more criteria or combinations of criteria (e.g., by the statistical approximation module) to determine the statistical approximation that may be most appropriate for the results of the optimization model and the account data criteria available. Criteria may include interpretability, such as monotonicity on FICO score, smoothness along certain dimensions, such as no big jumps in credit line as income increases, or regulatory compliance, such as no drop in credit line for customer ages above a certain value. In one aspect, the statistical approximation may be the approximation that provides a particular level of confidence related to the data, such as for example, the best fit to the data. In other embodiments, financial service account provider system 120 may select a statistical approximation based on other considerations, such as the availability of account data for particular criteria. Financial service account provider system 120 may store the statistical approximation selected to approximate the results of the optimization model (e.g., the statistical approximation module 160 of memory 135).

In step 225, financial service account provider system 120 may receive a request for an increase in a credit limit, such as from a customer (e.g., via client 105 and network 115). The request may include the customer's account data for one or more criteria used by the statistical approximation. Financial service account provider system 120 may also obtain account data for criteria used by the statistical approximation from a number of sources, as described above.

In step 230, financial service account provider system 120 may analyze the account data of the customer (e.g., by the statistical approximation module) using the statistical approximation, and determine an optimal credit limit. Financial service account provider system 120 may insert one or more account data values provided in step 225 for the customer into one or more variables of the statistical approximation and determines a single optimal credit limit via, for example the statistical approximation developed in process 220 and stored in system 120. This approximation is in the form of an equation relating customer data, in the form of variables, to an optimal credit limit. For example, if the approximation is in the form of a function relating FICO and number of financial service accounts associated with customer to an optimal credit limit, as determined by step 220, then step 225 will provide FICO and number of financial service accounts associated with customer values for the customer requesting a credit increase, via systems 110 and 125. The variables FICO and number of financial service accounts associated with customer in the function determined in step 220 now can be populated with numerical values in system 120, and then a numerical value for the optimal credit line can be determined using the same function.

In step 235, financial service account provider system 120 may assign an increase (or decrease) in credit line to the customer's financial service account based on the optimal credit limit determined by the statistical approximation. In one aspect, financial service account provider system 120 may determine the increase (or decrease) in credit line by comparing the current credit limit of the customer's financial service account to the optimal credit limit generated by the statistical approximation, where the difference between these two values is equivalent to the credit line increase (or decrease). One of skill in the art would understand process 200 to apply to a variety of financial service account decisions, such as approving new accounts or reviewing the current credit limits of customers without an explicit request from a customer.

Figure 3:
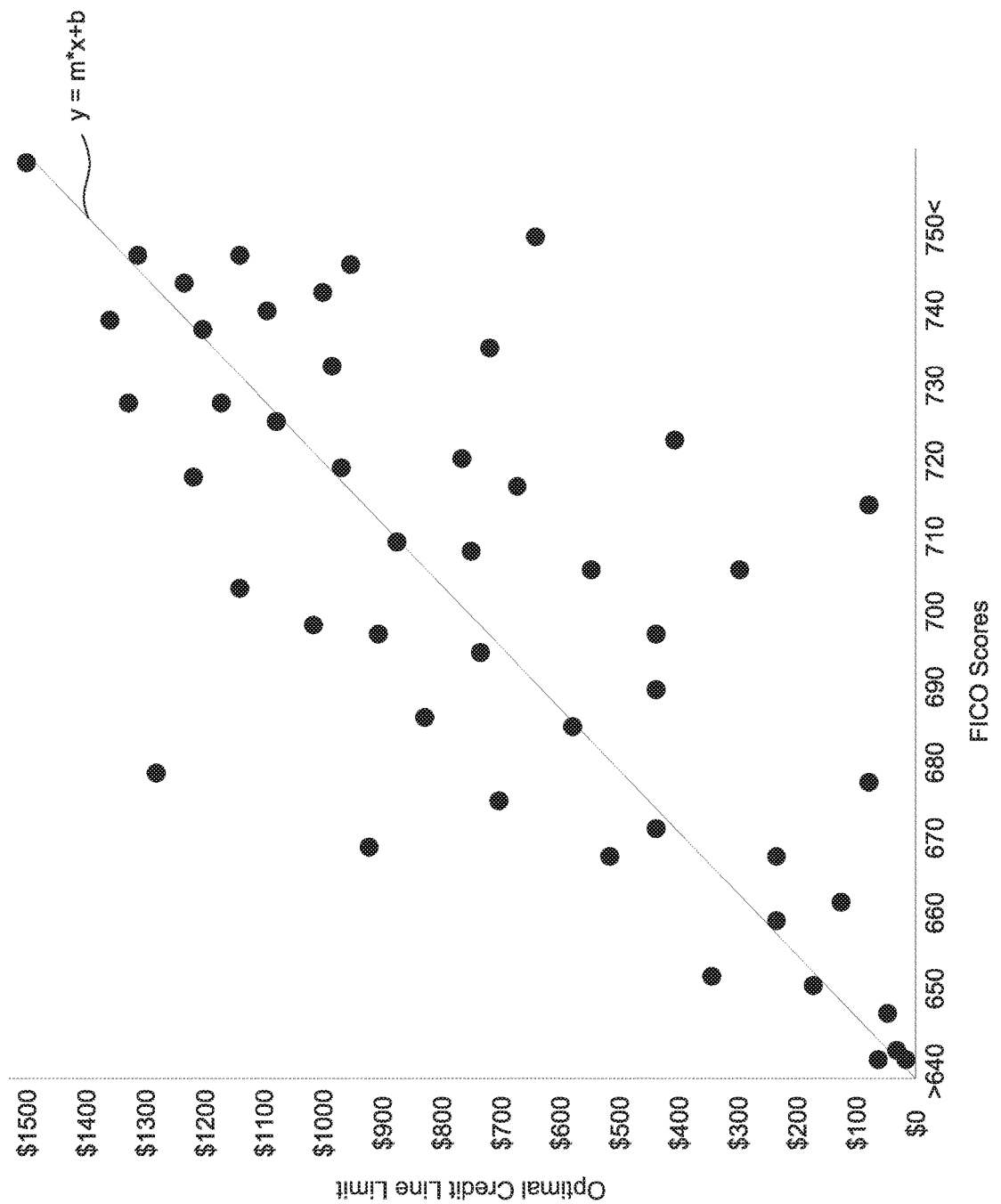
FIG. 3 is an example of a graphical representation of a statistical approximation of the results of an optimization model consistent with the disclosed embodiments.

FIG. 3 is an example of a graphical representation of a statistical approximation of the results of an optimization model consistent with disclosed embodiments. The statistical approximation exemplified in FIG. 3 is a linear regression based on FICO scores; however, other statistical approximations are known in the art and may be used consistent with the embodiments described herein. Moreover, the use of FICO scores in FIG. 3 is merely for demonstrative purposes. Other account data criterion (and the use of more than one account data criterion) are contemplated and may be used consistent with embodiments described herein.

In certain embodiments, financial service account provider system 120 may generate optimal credit limits based on the analysis of the historical account data for a number of customers. FIG. 3 shows an example of a graph depicting exemplary credit line limits based on, for example, FICO scores. As shown in FIG. 3, the optimal credit line limits may be represented by points plotted at various optimal according to the FICO scores of the customers associated with the optimal credit line limits. In certain aspects, financial service account provider system 120 may determine the exemplary optimal credit limits based on a certain number of account data criteria used by the optimization model. In one aspect, financial service account provider system 120 may use a linear regression approximation to determine the optimal credit limits. The exemplary statistical approximation of these optimization model results is represented by the line defined by the equation $y=m*x+b$. Financial service account provider system 120 may use the statistical approximation to determine an optimal credit limit for a customer based on only the FICO score of the customer. For example, a customer with a FICO score of 720 should be provided a credit limit of $1,000, according to the statistical approximation.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in hardware alone. Moreover, the disclosed embodiments may be implemented as a combination of automation and assisted manual switching. Additionally, although disclosed aspects are described as being stored in a memory on a computer, one skilled in the art will appreciate that these aspects can also be stored on other types of computer-readable media, such as secondary storage devices, like hard disks, floppy disks, a CD-ROM, or other forms of RAM or ROM. In addition, an implementation of software for disclosed aspects may use any variety of programming languages, such as Java, C, C++, JavaScript, or any other now known or later created programming language.

Other embodiments will be apparent to those skilled in the art from consideration of the specification and practice of the embodiments disclosed herein. It is intended that the specification and examples be considered as exemplary only, with the true scope and spirit being indicated by the following claims.

The disclosed embodiments may be performed with clients 102 that are mobile devices or tablets through mobile applications that provide communications with the functionalities of financial service account provider system 120 as disclosed herein. In other embodiments, financial service account provider system 120 may not be associated with any particular financial service account provider 125 or any type of account provider, but rather it may be associated with a third party system that is leveraged by account provider(s) determine the credit line limits or similar decisions for customers. For instance, a business may implement the disclosed embodiments such that it offers credit line determining services for other businesses (e.g., financial service account provider 125). For example, a business entity may host and provide financial service account provider system 120 and its functionalities such that financial service account provider system 120 performs credit line determination processes on behalf of one or more account providers. The hosting financial service account provider system entity may charge fees for such services, and those fees may be adjusted based on the types of credit line determination services provided, the number of credit line determinations completed, or other fee arrangements. In such embodiments, one or more of the credit line determinations may be performed by financial service account provider 125, while others performed by the third party financial service account provider system provider. Alternatively, financial service account provider system 120 may perform all of the credit line determinations for a customer and report results to a financial service account provider 125 through known computer systems and networking components.

In addition, the disclosed embodiments may not be limited to any particular type of account or device. That is, instead of financial service accounts, aspects of the disclosed embodiments may be implemented to provide credit limit determinations or risk assessments for any type of account (e.g., financial, memberships, utilities, phone services, etc.). Further, the disclosed embodiments may be provided as a one-stop online location for providing credit line determinations for one or more different types of accounts. Further, financial service account provider system 125 may provide credit limit determinations for businesses instead of individuals, wherein the account data for a particular business may be used to determine the credit line of that business. One of skill in the art would understand the types of account data criteria for businesses that would be advantageous. For example, account data on the annual net revenues for a business may be used (instead of annual income for an individual).

What is claimed is:

1. A financial service account system for determining optimal credit limits, comprising:
   a memory storing instructions; and
   a processor configured to execute the instructions to perform operations comprising:
      receiving account data associated with a customer account;
      performing real-time calculations providing optimal underwriting criteria at an account level, wherein the real-time calculations comprise:
         generating an optimization model based on a plurality of account criteria, the plurality of account criteria comprising data from a set of financial service accounts;
         applying the optimization model to the account data to model likely outcomes associated with a plurality of underwriting criteria, wherein the underwriting criteria comprise data required for risk assessment;
         determining an estimated optimal credit line for a customer account based on a comparison of one or more underwriting criteria associated with the customer account;
         comparing the estimated optimal credit line for the customer account with a current credit line of the customer account;
         refining an estimated optimal credit line for a customer account based on a comparison of one or more account data values associated with the customer account and a statistical approximation;
         comparing the refined optimal credit line for the customer account with a current credit line of the customer account;
         generating a plurality of statistical approximations based on a percentage of customers associated with the underwriting criteria of the estimated optimal credit line;
         selecting a statistical approximation based on a confidence level for the selected approximation, associated with the one or more account criteria from the plurality of account criteria, the one or more account criteria having a minimum amount of data available;
         performing a regression analysis of the account data based on the selected statistical approximation to determine an optimal credit line for the customer account;
         comparing the determined optimal credit line for the customer account with the current credit line of the customer account; and
         designating best of the determined optimal credit line, the current credit line, and the estimated optimal credit line as the optimal credit line; and
      applying, based on a result of the real-time calculations, the optimal credit line to the customer account in response to a request from a customer for a credit line adjustment for the customer account.

2. The system of claim 1, wherein the processor is further configured to execute the instructions to perform operations comprising:
   receiving a request for a credit line determination for the customer account, the request including one or more values for the one or more account data criteria used to generate the statistical approximation.

3. The system of claim 1, wherein the regression analysis comprises parametric regressions and nonparametric regressions.

4. The system of claim 1, wherein the one or more account data criteria comprises at least one of: past customer behavior, customer credit data, customer demographic data, customer financial data, or customer non-financial data.

5. The system of claim 1, wherein the processor is further configured to execute instructions to perform operations comprising:
   adjusting the current credit line of the customer account according to the comparison of the estimated optimal credit line with the current credit line.

6. The system of claim 1, wherein the processor is further configured to execute instructions to format the account data before applying the optimization model.

7. The system of claim 6, wherein formatting the account data comprises at least one of removing duplicate records, removing typographical errors, expanding abbreviations, adding special characters, or removing special characters.

8. The system of claim 1, wherein the system is associated with a third party to a financial service provider associated with the customer account.

9. A financial service account system comprising:
a non-transitory memory storing instructions; and
a processor configured to execute the instructions to implement modules comprising:
a data miner module configured to receive account data associated with a customer account,
an optimization model module configured to:
generate an optimization model, based on a plurality of account criteria, the plurality of account criteria comprising data from a set of financial service accounts,
apply the optimization model to the account data to model likely outcomes associated with a plurality of credit limits and select a subset of the credit limits based on one or more of the outcomes,
determine an estimated optimal credit line for a customer account based on a comparison of one or more underwriting criteria associated with the customer account,
compare the estimated optimal credit line for the customer account with a current credit line of the customer account,
refine the estimated optimal credit line for a customer account based on a comparison of one or more account data values associated with the customer account and a statistical approximation,
compare the refined optimal credit line for the customer account with a current credit line of the customer account,
compare the determined optimal credit line for the customer account with the current credit line of the customer account, and
designate best of the current credit line and the estimated optimal credit line as the optimal credit line; and
a statistical approximation module configured to:
generate a plurality of statistical approximations based on a percentage of customers associated with the underwriting criteria of the estimated optimal credit line,
provide a particular level of confidence based on the plurality of account criteria,
select a statistical approximation based on a confidence level for the selected approximation, associated with one or more account criteria from the plurality of account criteria, the one or more account criteria having a minimum amount of data available,
perform regression analysis based on the one or more account criteria to determine an optimal credit limit, and
send the determined optimal credit limit to a financial service account system for updating the credit limit.

10. The system of claim 9, wherein the system further comprises a data interpreter module to format the account data obtained by the data miner.

11. The system of claim 9, wherein the account data comprises at least one of: past customer behavior, customer credit data, customer demographic data, customer financial data, or customer non-financial data.

12. The system of claim 9, wherein the regression analysis comprises parametric regressions and nonparametric regressions.

13. The system of claim 12, wherein the regression comprises at least one of a linear regression or logistical regression.

14. The system of claim 13, wherein the linear regression or logistical regression is based on customer credit scores or customer incomes.

15. The system of claim 9, wherein the statistical approximation provides at least a level of confidence for the optimal credit lines.

16. The system of claim 15, wherein the statistical approximation comprises a best fit for the optimal credit lines.

17. The system of claim 9, wherein the statistical approximation module is further configured to determine an estimated optimal credit line for a customer based on one or more criteria of the customer.

18. The system of claim 9, wherein the statistical approximation module is further configured to generate the statistical approximation based on a confidence level for the approximation and a percentage of customers with information for the one or more account data criteria used to determine the optimal credit limits.

* * * * *